No. 843,792. PATENTED FEB. 12, 1907.
S. N. BOYD.
STOCK FEEDING TROUGH.
APPLICATION FILED FEB. 12, 1906.
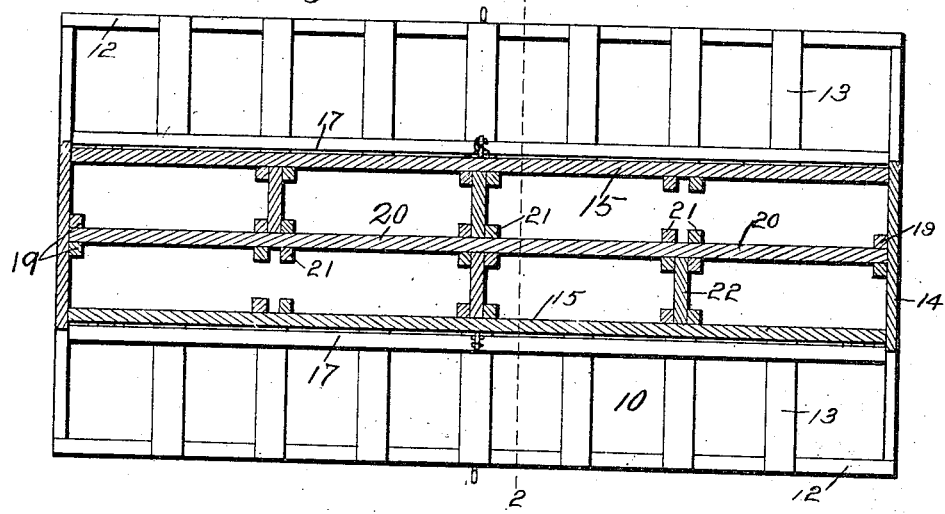
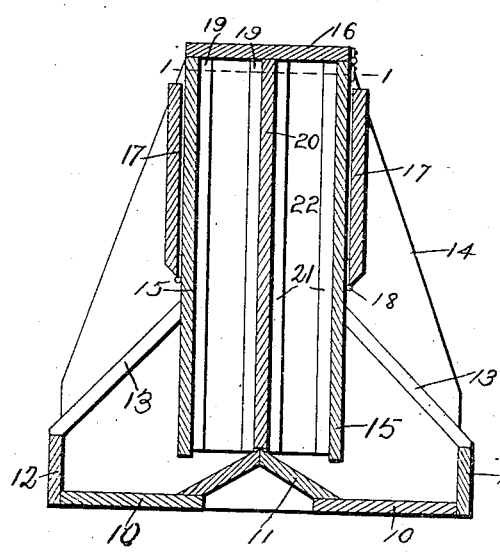 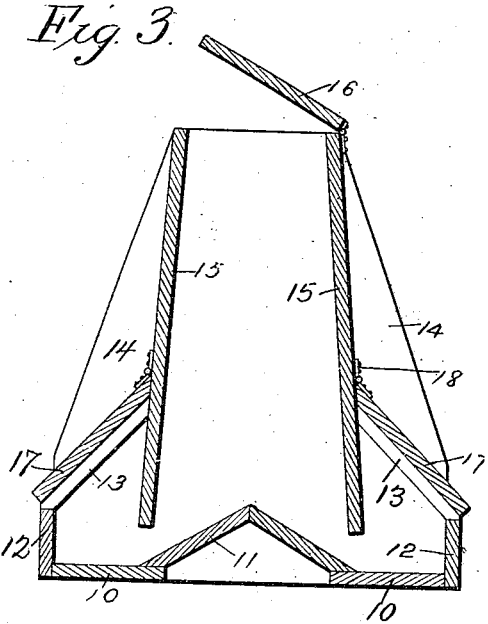
Witnesses
R. L. Spencer
A. G. Hague
Inventor S. N. Boyd
by Orwig Lane Att'ys.

UNITED STATES PATENT OFFICE.

SAMUEL N. BOYD, OF RUSSELL, IOWA.

STOCK-FEEDING TROUGH.

No. 843,792.     Specification of Letters Patent.     Patented Feb. 12, 1907.

Application filed February 12, 1906. Serial No. 300,783.

*To all whom it may concern:*

Be it known that I, SAMUEL N. BOYD, a citizen of the United States, residing at Russell, in the county of Lucas and State of Iowa, have invented a certain new and useful Stock-Feeding Trough, of which the following is a specification.

The object of my invention is to provide a feeding-trough for general use in feeding live stock of different kinds and to provide simple, durable, and inexpensive means for feeding different kinds of food in the same trough in limited quantities.

My invention consists in the construction, arrangement, and combination of the various parts of the device whereby the objects contemplated are attained, as hereinafter more fully set forth, pointed out in my claim, and illustrated in the accompanying drawings, in which—

Figure 1 shows a horizontal sectional view of the complete trough, taken on the line 1 1 of Fig. 2. Fig. 2 shows a vertical transverse sectional view, taken on the line 2 2 of Fig. 1; and Fig. 3 shows a similar view of a slightly-modified form.

Referring to the accompanying drawings, I have used the reference-numeral 10 to indicate the base of the trough, the central portion of which is arched at 11 to direct the food downwardly and toward the sides of the base. At the sides of the base 10 are the uprights 12, and extending from the uprights 12 upwardly and inwardly are the slats 13, designed to prevent the animals from standing in the trough and yet not interfering with the animals feeding from the trough. The end pieces of the trough are indicated by the numeral 14, and they project upwardly far enough to serve as the ends for the hopper.

The hopper is composed of two upright side pieces 15, extending from one end piece 14 to the other and having their lower ends spaced apart from the base 10 far enough to permit feed to pass under them and over the inclined bottom pieces 11.

The numeral 16 indicates a cover hinged to the top of one of the side pieces 15 to inclose the space between said sides. I have also provided covers for the spaces between the sides 15 and the uprights 12. These covers are indicated by the numeral 17 and are hinged at 18 to the sides 15 and when closed assume the position shown in Fig. 3 resting on top of the slats 13.

On the inner faces of the end pieces 14 I have provided the strips 19 to receive the detachable partition 20. This partition is provided with a number of pairs of strips 21 on both faces, and the inner faces of the sides 15 are also provided with similar pairs of strips to admit the detachable partition-pieces 22.

In the modified form shown in Fig. 3 the sides 15 are shown with their lower ends spaced apart further than their upper ends to avoid danger of having feed become wedged between them. In other respects the trough is the same as in my preferred form, the partitions being omitted.

In practical use and assuming that it is desired to feed certain foods which are of large bulk, then the partition between the sides 15 are omitted and the hopper may be filled with this food, which will pass upon the bottom 10 as fast as space is made for it on the bottom. Assuming that it is desired to deliver different kinds of food to the opposite sides of the trough or to deliver food to one side only, then I place the central partition 20 in position between the strips 19, with its lower edge resting upon the arched bottom 11. If it is desired to feed other articles in still more limited quantities, I then place the transverse partitions 22, as many as may be desired, in position, and in this way a quantity of salt may be contained in the hopper at one corner and be gradually fed into one corner only of the trough, or if it is desired to keep the kinds of food separated in the same side of the trough the operator may place the food in the compartments at the opposite ends of the hopper and have the central compartments empty, and in this way the food will not become mingled in the trough and yet will be fed slowly in limited quantities.

Having thus described my invention, what I claim, and desire to secure by Letters Patent of the United States therefor, is—

An improved feeding-trough, comprising a base with an arched central portion, uprights at the sides of the base, upright longitudinal hopper sides supported above the arched center of the base and with their lower edges spaced apart therefrom, end pieces for the hopper and trough, a cover for the top of the hopper, slats extending upwardly and inwardly from the trough sides to the hopper sides, hinged covers at the sides of the hopper to overlap the said slats, a pair of strips on each end piece and a detachable longitudinal partition to enter between said pairs of strips and to rest upon the arched bottom, a number of pairs of strips on the sides of the central detachable partition and on the inner faces of the hopper sides and transverse partitions to be detachably inserted between said pairs of strips.

Des Moines, Iowa, December 7, 1906.

SAMUEL N. BOYD.

Witnesses:
C. D. SMITH,
W. L. WERTS.